United States Patent
George et al.

(10) Patent No.: US 10,649,425 B2
(45) Date of Patent: May 12, 2020

(54) SMART INTEGRAL FIELD UPGRADE MODULE

(71) Applicant: Honeywell International Inc., Morristown, NJ (US)

(72) Inventors: Denise Patricia George, Warminster, PA (US); Anant Vidwans, Telangana (IN)

(73) Assignee: Honeywell International Inc., Morris Plains, NJ (US)

( * ) Notice: Subject to any disclaimer, the term of this patent is extended or adjusted under 35 U.S.C. 154(b) by 708 days.

(21) Appl. No.: 14/799,417

(22) Filed: Jul. 14, 2015

(65) Prior Publication Data
US 2017/0017217 A1     Jan. 19, 2017

(51) Int. Cl.
*G06F 9/44*     (2018.01)
*G06F 9/445*    (2018.01)
*G05B 19/042*   (2006.01)

(52) U.S. Cl.
CPC .. *G05B 19/042* (2013.01); *G05B 2219/25112* (2013.01); *G05B 2219/25428* (2013.01)

(58) Field of Classification Search
CPC ........ G05B 19/042; G05B 2219/25112; G05B 2219/25428
See application file for complete search history.

(56) References Cited

U.S. PATENT DOCUMENTS

| | | | | |
|---|---|---|---|---|
| 8,594,850 B1* | 11/2013 | Gourlay | ................. | G05B 15/02 700/276 |
| 9,139,102 B2* | 9/2015 | DeBoer | ............... | B60L 11/1838 |
| 9,307,347 B2* | 4/2016 | Reunamaki et al. | ........................ | H01L 23/3107 257/676 |
| 9,374,271 B2* | 6/2016 | Hasegawa | ........... | H04L 41/0618 |
| 2006/0267792 A1 | 11/2006 | Schnaare et al. | | |
| 2007/0282478 A1* | 12/2007 | Al-Ali | ................ | A61B 5/14551 700/108 |
| 2009/0292996 A1 | 11/2009 | Gowtham et al. | | |
| 2010/0131084 A1 | 5/2010 | Van Camp | | |
| 2012/0029304 A1* | 2/2012 | Medina | ................ | A61B 5/0002 600/300 |
| 2012/0109343 A1* | 5/2012 | Shah | .................... | G05B 19/409 700/83 |

(Continued)

FOREIGN PATENT DOCUMENTS

JP     2015-087975 A     5/2015

OTHER PUBLICATIONS

Octavian Postolache, Smart Sensors and Pervasive Computing for Healthcare, 2013, pp. 1-6. https://ieeexplore.ieee.org/stamp/stamp.jsp?tp=&arnumber=6707281 (Year: 2013).*

(Continued)

*Primary Examiner* — Mongbao Nguyen

(57) ABSTRACT

A system includes a control system and a field device. The control system is configured to communicate data with one or more field devices. The field device includes a sensor module configured to monitor a process in the control system. The field device also includes a communication module configured to detachably couple to both a display configured to display information related to the monitored process and an upgrade module configured to control a software or firmware upgrade process associated with the sensor module.

14 Claims, 3 Drawing Sheets

(56) References Cited

U.S. PATENT DOCUMENTS

| | | | | |
|---|---|---|---|---|
| 2012/0221155 | A1* | 8/2012 | Miles | G05B 19/0423 700/286 |
| 2013/0020991 | A1* | 1/2013 | DeBoer | B60L 11/1838 320/109 |
| 2014/0120843 | A1* | 5/2014 | Yamaji | H04W 52/0209 455/67.11 |
| 2014/0156033 | A1 | 6/2014 | Daraiseh et al. | |
| 2014/0215167 | A1* | 7/2014 | Ochiai | G05B 19/042 711/154 |
| 2014/0276571 | A1* | 9/2014 | Ludolph | G16H 40/63 604/506 |
| 2015/0120972 | A1* | 4/2015 | Tanimura | G06F 13/409 710/106 |
| 2015/0212550 | A1* | 7/2015 | Wouhaybi | G06F 3/14 345/1.1 |
| 2015/0222730 | A1* | 8/2015 | Gower | H04L 67/42 709/203 |
| 2015/0227127 | A1* | 8/2015 | Miller | G05B 19/042 700/244 |
| 2015/0289015 | A1* | 10/2015 | Jung | H04N 21/4181 725/132 |
| 2015/0291049 | A1* | 10/2015 | DeBoer, III | B60L 11/1838 320/109 |
| 2015/0358790 | A1* | 12/2015 | Nasserbakht | H04W 4/16 455/414.1 |
| 2016/0261972 | A1* | 9/2016 | Ozoe | H04W 4/70 |

OTHER PUBLICATIONS

Honeywell, ST 800 Series HART/DE Option User's Manual, 2014, pp. 1-128. https://www.honeywellprocess.com/library/support/Public/Documents/34-ST-25-38.pdf (Year: 2014).*

Emerson, Micro Motion® 9739 MVD Electronics Module Upgrade, 2010, pp. 1-40. https://www.emerson.com/documents/automation/guide-mvd-transmitters-model-9739-en-63332.pdf (Year: 2010).*

International Searching Authority, "Notification of Transmittal of the International Search Report and the Written Opinion of the International Searching Authority, or the Declaration," International Application No. PCT/US2016/041066, dated Sep. 29, 2016, 5 pages, publisher International Application Division Korean Intellectual Property Office, Daejeon, Republic of Korea.

International Searching Authority, "Written Opinion of the International Searching Authority," International Application No. PCT/US2016/041066, dated Sep. 29, 2016, 7 pages, publisher International Application Division Korean Intellectual Property Office, Daejeon, Republic of Korea.

Honeywell, Technical Brief, "STD700 SmartLine Differential Pressure Specification 34-ST-03-101", Dec. 2014.

Honeywell, User's Manual, "ST800 SmartLine Pressure Transmitters User's Manual", 34-ST-25-35, Revision 9.0, Dec. 2014.

* cited by examiner

SMART INTEGRAL FIELD UPGRADE MODULE

TECHNICAL FIELD

This disclosure is generally directed to industrial process control and automation systems. More specifically, this disclosure is directed to a smart integral field upgrade module.

BACKGROUND

In the process control industry, use of smart pressure, temperature and level field instruments has become commonplace, because they can be installed almost anywhere at a facility due to their compact size. The modules in today's smart transmitters use advanced low power microcontrollers to do much of the processing that was historically done by discrete electronic components.

SUMMARY

This disclosure provides an apparatus and method for updating a sensor module, communications module, and the terminal module of a field device.

In a first embodiment, a system is provided. The system includes a control system and a field device. The control system is configured to communicate data with one or more field devices. The field device includes a sensor module configured to monitor a process in the control system. The field device also includes a communication module configured to detachably couple to both a display configured to display information related to the monitored process and an upgrade module configured to control a software or firmware upgrade process associated with the sensor module.

In a second embodiment, a field device is provided. The field device includes a sensor module configured to monitor a process. The field device also includes a communication module configured to detachably couple to both a display configured to display information related to the monitored process and an upgrade module configured to control a software or firmware upgrade process associated with the sensor module.

In a third embodiment, a method is provided. The method includes removing a display module detachably coupled to a communications module, wherein the communications module is connected to a sensor module. The method also includes attaching an upgrade module to the communications module. The method further includes upgrading the sensor module using a software or firmware upgrade process controlled by the upgrade module. The method also includes removing the upgrade module and reattaching the display module to the communications module after completion of the upgrading of the sensor module.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
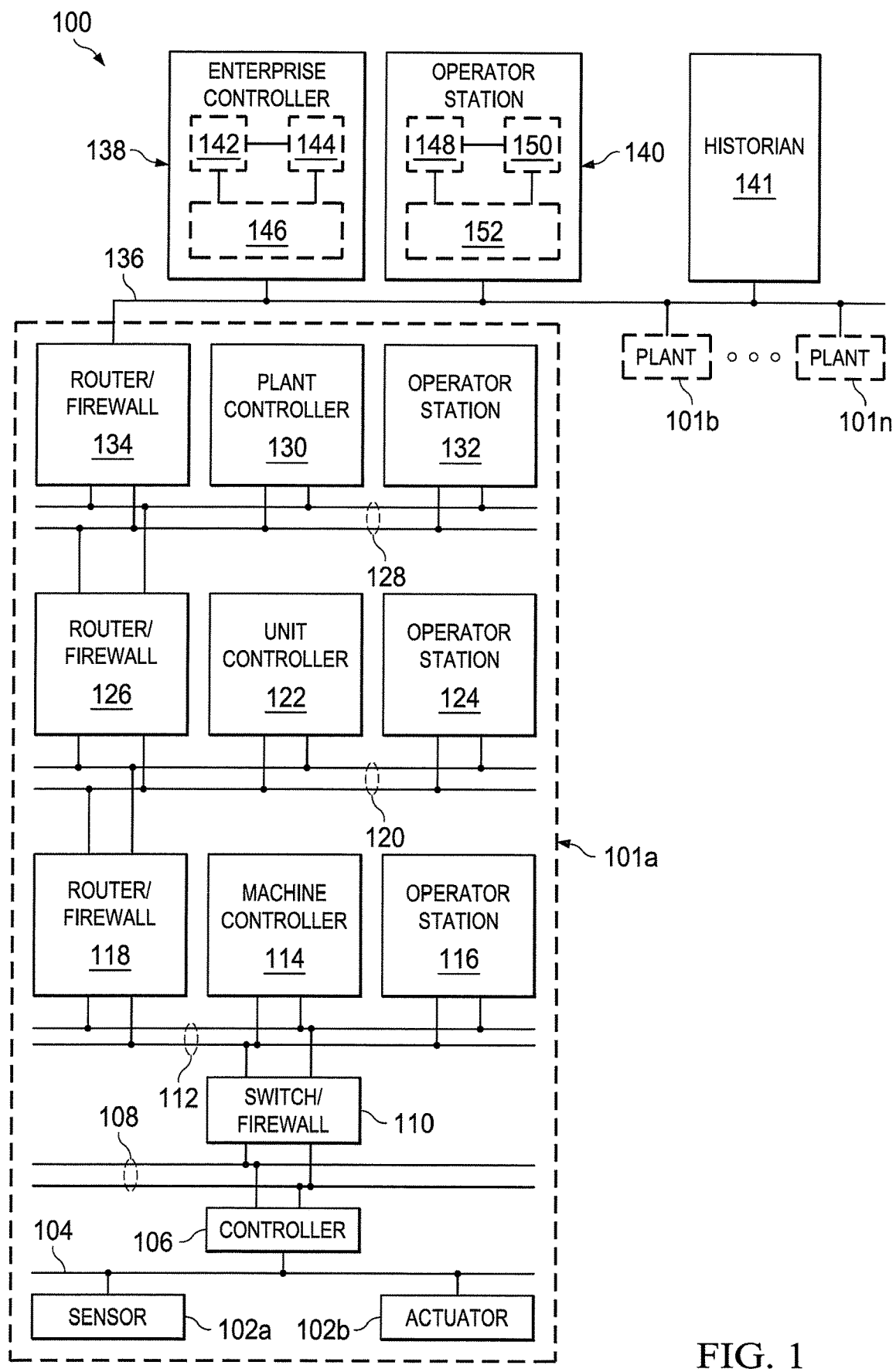
FIG. 1 illustrates an example industrial control and automation system having a field device according to this disclosure.

FIGS. 1 through 4, discussed below, and the various examples used to describe the principles of the present invention in this patent document are by way of illustration only and should not be construed in any way to limit the scope of the invention. Those skilled in the art will understand that the principles of the present invention may be implemented in any suitable manner and in any type of suitably arranged device or system.

The newest generation of microcontrollers perform advanced calculations and other algorithms within the transmitter to improve process performance and provide additional diagnostic detection and reporting.

In order to shorten the initial time to market for the transmitter, these features are sometimes implemented in phased releases with basic features being released followed by more advanced features. When the advanced features are released, customers may want to add these advanced features to transmitters that are already installed in their facility. Adding a new feature or enhanced ability to an installed field instrument typically involves an embedded software or firmware upgrade of one or more of the electronic modules in the field instrument.

For instance, if it were beneficial for a customer to add a new feature to an existing communications module, the customer could temporarily take the transmitter processes off-line for the transmitter to be updated, and remove the communications module. Then there would be two options to implement the update. The first option is for the customer to install a new communication module having the feature to replace the module that does not have the feature, and bring the transmitter processes back on-line. The second option is to take the communications module to the maintenance area, upgrade the embedded software or firmware in that module using a maintenance device (e.g., a PC), reinstall the module into the transmitter, and bring the transmitter processes back on-line.

However, for some sensor module types, upgrading the embedded software or firmware can be much more challenging. For example, in a pressure or level field instrument, the sensor section can be physically integrated into the process. The act of swapping out a sensor module can lead to other unforeseen issues simply by disturbing the physical installation. For example, the removal of certain types of pressure sensor first requires the work area to be intrinsically safe. Next, all piping feeding the pressure sensor section is bypassed and piping to the pressure sensor is drained. Then the entire field instrument to be upgraded is removed and taken to the maintenance area. Once in the maintenance area, the top works is partially disassembled to allow access to the sensor module, and the upgrade of the sensor embedded software or firmware is performed from the PC. Once the embedded software or firmware upgrade is complete, the transmitter is reassembled and checked to ensure that it works as expected. Once this final check is complete, the transmitter can be re-installed and placed back into service. This process can take several hours to a few days.

In addition to the challenges presented above, the fact that most field instruments are installed in an intrinsically safe environment precludes the ability to 'just take a laptop' out to the field site and upgrade the field instrument in place. Many field instruments are installed in elevated locations like pipelines or at the top of tanks or in hard to reach areas where maintenance personnel cannot just walk up to a transmitter, take it apart on the spot, and hook it up to a laptop while standing on a ladder.

Finally, the most concerning issue associated with the physical removal of the entire field instrument is safety. The fact that the interconnecting pipes can contain any type of liquid, gas or steam under pressure can pose an extreme risk to the maintenance personnel working on the task. In other cases, the process could involve a hazardous substance that can harm wildlife or the environment if it were to get into ground water. On a larger scale this risk could extend to humans living in a nearby community. Any time the process contents are exposed to the outside environment, there exists a risk of contamination at the open points where the field instrument was removed.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Multiple controllers 106 could also operate in redundant configurations, such as when one controller 106 operates as a primary controller while another controller 106 operates as a backup controller (which synchronizes with the primary controller and can take over for the primary controller in the event of a fault with the primary controller). Each controller 106 includes any suitable structure for interacting with one or more sensors 102a and controlling one or more actuators 102b. Each controller 106 could, for example, represent a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers could include one or more processing devices 142 and one or more memories 144 for storing instructions and data used, generated, or collected by the processing device(s) 142. Each of the controllers could also include at least one network interface 146, such as one or more Ethernet interfaces or wireless transceivers. Also, each of the operator stations could include one or more processing devices 148 and one or more memories 150 for storing instructions and data used, generated, or collected by the processing device(s) 148. Each of the operator stations could also include at least one network interface 152, such as one or more Ethernet interfaces or wireless transceivers.

Although FIG. 1 illustrates one example of an industrial process control and automation system 100, various changes may be made to FIG. 1. For example, a control system could include any number of sensors, actuators, controllers, servers, operator stations, and networks. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, process control systems are highly configurable and can be configured in any suitable manner according to particular needs.

Figure 2:
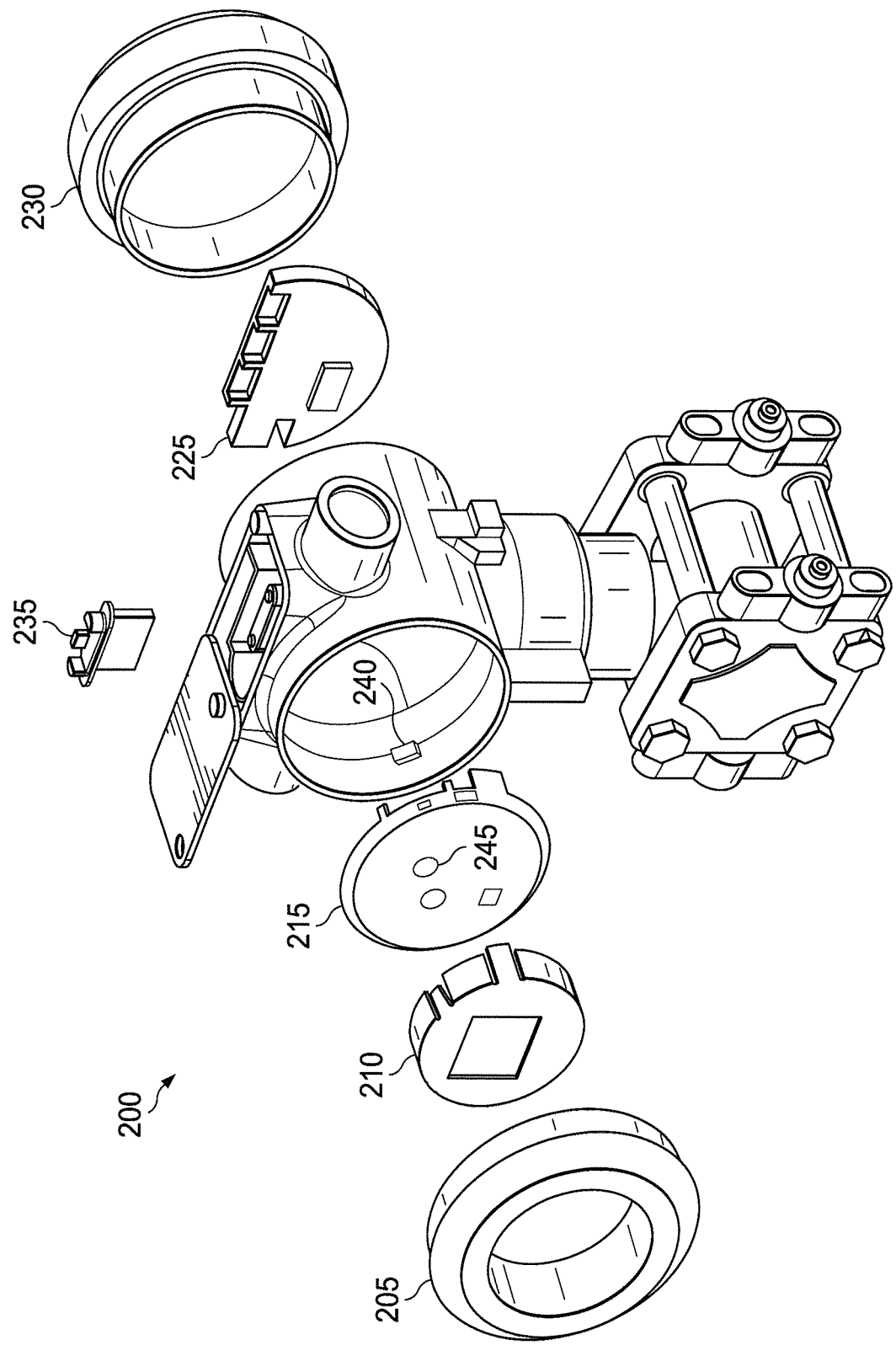
FIG. 2 illustrates an exploded view of a field device according to this disclosure.

FIG. 2 illustrates an exploded view of a field device 200 according to this disclosure. For ease of explanation, the field device 200 is described as being used in the system 100 of FIG. 1. For example, the field device 200 may represent (or be represented by) a sensor 102a, an actuator 102b, a controller 106, another component, or a combination of components described in FIG. 1. However, the field device 200 could be used in any other suitable system.

FIG. 2 illustrates an exploded view of a field device 200 according to the various embodiments of the present disclosure.

The field device 200 includes a first end cap 205, a display module 210, a communications module 215, a housing 220, a terminal block module 225, a second end cap 230, a button configuration 235, and a sensor module 240. The field device 200 is a modularized system in which the communications module 215, the terminal block module 225, and the display module 210 can be installed or removed, in most cases under power, without violating intrinsic safety.

The first end cap 205 secures the display module 210 and the communications module 215 to the housing 220. The second end cap 230 secures the terminal block module 225 to the housing 220. Both the first end cap 205 and the second end cap 230 seal the electrical components in the housing 220 to prevent any contaminants from entering the housing 220.

The display module 210 displays process information on a screen. The display module 210 has a display, such as an LCD display, that can be viewed through a clear surface of the first end cap 205. The display module 210 is configured to display different screens and formats including process variable requirements, bar graphs, and process trend information. The display module 210 is programmed with a robust library of engineering units and can be programmed to include custom units. The display module 210 is also programmed with different languages and diagnostic indications. The display module 210 is adjustable through 90 degrees of rotation to facilitate convenient viewing for all installation positions. The display module 210 detachably couples to the communications module 215 using standardized power and communications connection 245. The display module 210 is controlled either remotely or by using the local button configuration 235. The button configuration 235 includes a plurality of buttons programmed with different functionality for controlling the display.

The communications module 215 connects to the sensor module 240 found in the housing 220. The sensor module 240 is installed in the housing 220 and monitors the process of the field device 200. Different processes monitored include, for example, pressure, temperature and level.

The terminal block module 225 includes terminal boards wired for standard or advanced lightning-protected applications.

Although FIG. 2 illustrates details of an example field device 200, various changes may be made to FIG. 2. For example, the number(s) and type(s) of components shown in FIG. 2 are for illustration only. Also, the functional divisions of the field device 200 shown in FIG. 2 are for illustration only. Various components in FIG. 2 could be omitted, combined, or further subdivided and additional components could be added according to particular needs.

Figure 3:
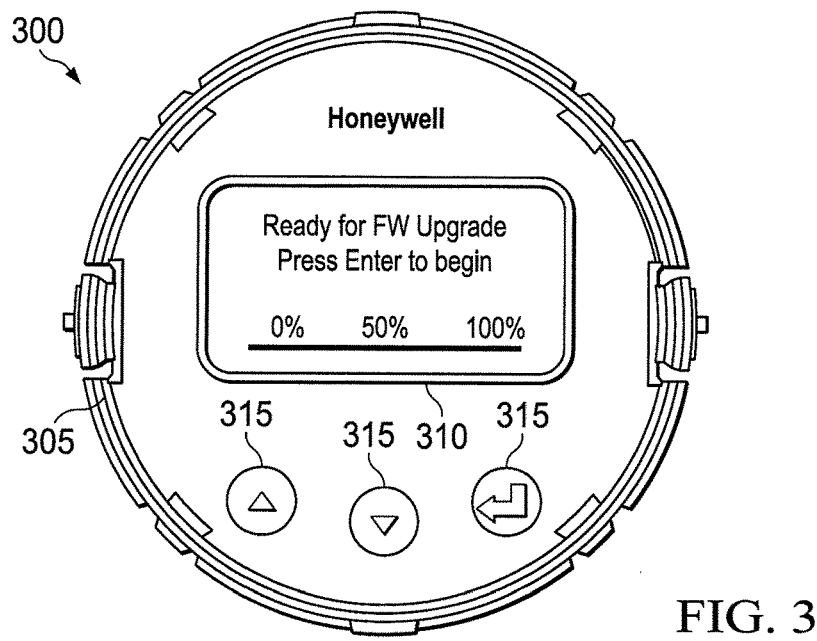
FIG. 3 illustrates an upgrade module according to this disclosure.

FIG. 3 illustrates an upgrade module 300 according to various embodiments of the present disclosure.

The upgrade module 300 is an intrinsically safe, self-contained embedded software or firmware upgrade tool with a human-machine interface (HMI) 305 that can be physically installed in place of a display module 210 on any field device 200. The upgrade module 300 replaces the display module during the software or firmware upgrade process. The upgrade module 300 uses the same power and communications connection 245 with the communication module 215 as used by the display module 210. The upgrade module 300 includes a memory storing data and instructions associated with a software or firmware upgrade for a sensor module.

In certain embodiments, the HMI 305 includes a 128×64 pixel graphic display 310 and one or more buttons 315 located on the bezel. The buttons 315 are configured to accept input from an operator or user. The display 310 allows the user to monitor the status of the firmware upgrade and view any other relevant parameters associated with the sensor module 240. The buttons 315 allow the user to navigate menu options and display screens associated with the upgrade process. The upgrade module 300 can be orientated in 90 degree increments allowing for easy readability and use regardless of the orientation of the transmitter it is connected to.

Although FIG. 3 illustrates details of an example upgrade module 300, various changes may be made to FIG. 3. For example, the number(s) and type(s) of components shown in FIG. 3 are for illustration only. Also, the functional divisions of the upgrade module 300 are for illustration only. Various components in FIG. 3 could be omitted, combined, or further subdivided and additional components could be added according to particular needs.

Figure 4:
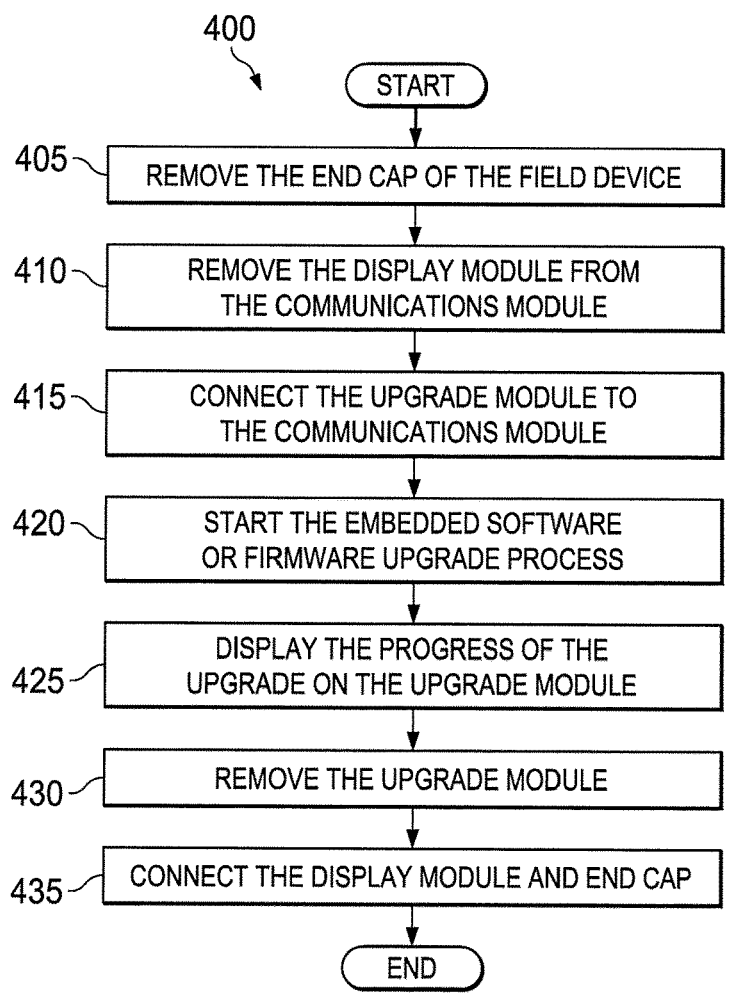
FIG. 4 illustrates an example method for upgrading a sensor module installed in a field device according to this disclosure.

FIG. 4 illustrates an example method 400 for upgrading a sensor module installed in a field device according to this disclosure. For ease of explanation, the method 400 is described with respect to the field device 200 and upgrade module 300 shown in FIGS. 2 and 3. However, the method 400 could be used by any suitable field device and in any suitable system.

The method 400 includes block 405, in which the first end cap 205 of the field device 200 is removed. In block 410, the display module 210 is removed from the communications module 215. In block 415, the upgrade module 300 is connected to the communications module 215. In block 420, the buttons 315 on the upgrade module 300 are used to start the embedded software or firmware upgrade process. In block 425, the progress of the software or firmware upgrade process is displayed on the display 310 of the HMI 305 for the upgrade module 300. In block 430, the upgrade module 300 is removed from the communications module 215 when the upgrade is completed. In block 435, the display module 210 and the first end cap 205 are reconnected to the field device 200.

Although FIG. 4 illustrates one example of a method 400 for upgrading a sensor module installed in a field device, various changes may be made to FIG. 4. For example, while shown as a series of steps, various steps shown in FIG. 4 could overlap, occur in parallel, or occur multiple times. Moreover, some steps could be combined or removed and additional steps could be added.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for upgrading a sensor installed in a field device comprising:
monitoring a process in the filed device by a sensor;
removing a hardware display configured to display information related to the monitored process, detachably coupled to a communications hardware, wherein the communications hardware is connected to the sensor;
attaching an upgrade module to the communications hardware having standardized power and communications connection such that the upgrade module is configured to be connected to the sensor through the communication hardware and control a software or firmware upgrade process associated with the sensor;
upgrading the sensor using the software or firmware upgrade process controlled by the upgrade module; and
removing the upgrade module and reattaching the hardware display to the communications hardware after completion of the upgrading of the sensor,
wherein the upgrade module is configured to display progress information associated with the software or firmware upgrade process, and
wherein the hardware display and the upgrade module each detachably connect to the communication hardware using a same power connection and communication connection.

2. The method of claim 1, wherein the sensor is one of a pressure sensor, a temperature sensor, or a level sensor.

3. The method of claim 1, wherein the upgrade module is further configured to rotate its orientation in 90 degree increments.

4. The method of claim 1, wherein the upgrade module further comprises a plurality of buttons, the buttons configured to receive input from a user to control the upgrade module.

5. A field device comprising:
a sensor configured to monitor a process in the field device; and
a communication hardware having standardized power and communications connection configured to detachably couple between:
a hardware display configured to display information related to the monitored process; and
an upgrade module configured to control a software or firmware upgrade process associated with the sensor;
wherein the software or firmware upgrade process associated with the sensor comprising:
removing the hardware display configured to display information related to the monitored process, detachably coupled to the communications hardware, wherein the communications hardware is connected to the sensor;
attaching the upgrade module to the communications hardware having standardized power and communications connection such that the upgrade module is configured to be connected to the sensor through the communication hardware and control the software or firmware upgrade process associated with the sensor;
upgrading the sensor using the software or firmware upgrade process controlled by the upgrade module; and
removing the upgrade module and reattaching the hardware display to the communications hardware after completion of the upgrading of the sensor,
wherein the upgrade module is configured to display progress information associated with the software or firmware upgrade process;
wherein the hardware display and the upgrade module each detachably connect to the communication hardware using a same power connection and communication connection.

6. The field device of claim 5, wherein the sensor is one of a pressure sensor, a temperature sensor, or a level sensor.

7. The field device of claim 5, wherein the upgrade module is further configured to rotate its orientation in 90 degree increments.

8. The field device of claim 5, wherein the upgrade module further comprises a plurality of buttons.

9. The field device of claim 8, wherein the buttons are configured to receive input from a user to control the upgrade module.

10. A system comprising:
a control system configured to communicate data with one or more field devices; and
a field device comprising:
a sensor configured to monitor a process in the control system; and
communication hardware having standardized power and communications connection configured to detachably couple between:
a hardware display configured to display information related to the monitored process; and
an upgrade module configured to control a software or firmware upgrade process associated with the sensor,
wherein the software or firmware upgrade process associated with the sensor comprising:
removing the hardware display configured display information related to the monitored process, detachably coupled to the communications hardware, wherein the communications hardware is connected to the sensor;
attaching the upgrade module to the communications hardware having standardized power and communications connection such that the upgrade module is configured to be connected to the sensor through the communication hardware and control the software or firmware upgrade process associated with the sensor;
upgrading the sensor using the software or firmware upgrade process controlled by the upgrade module; and
removing the upgrade module and reattaching the hardware display to the communications hardware after completion of the upgrading of the sensor,
wherein the upgrade module is configured to display progress information associated with the software or firmware upgrade process, and
wherein the hardware display and the upgrade module each detachably connect to the communication hardware using a same power connection and communication connection.

11. The system of claim 10, wherein the sensor is one of a pressure sensor, a temperature sensor, or a level sensor.

12. The system of claim 10, wherein the upgrade module is further configured to rotate its orientation in 90 degree increments.

13. The system of claim 10, wherein the upgrade module further comprises a plurality of buttons.

14. The system of claim 13, wherein the buttons are configured to receive input from a user to control the upgrade module.

* * * * *